(12) United States Patent
Fiechter et al.

(10) Patent No.: US 6,609,051 B2
(45) Date of Patent: Aug. 19, 2003

(54) METHOD AND SYSTEM FOR CONDITION MONITORING OF VEHICLES

(75) Inventors: Claude-Nicolas Fiechter, Sunnyvale, CA (US); Mehmet H. Göker, Menlo Park, CA (US); Daniel Grill, Palo Alto, CA (US); Rainer Kaufmann, Stuttgart (DE); Thorsten Engelhardt, Stuttgart (DE); Achim Bertsche, Stuttgart (DE)

(73) Assignee: DaimlerChrysler AG

( * ) Notice: Subject to any disclaimer, the term of this patent is extended or adjusted under 35 U.S.C. 154(b) by 0 days.

(21) Appl. No.: 09/948,938

(22) Filed: Sep. 10, 2001

(65) Prior Publication Data

US 2003/0114965 A1 Jun. 19, 2003

(51) Int. Cl.⁷ .................. G01M 17/00; G06F 15/00
(52) U.S. Cl. .................. 701/33; 701/34; 700/31
(58) Field of Search .................. 701/29, 30, 31, 701/33, 34, 35; 700/30, 31

(56) References Cited

U.S. PATENT DOCUMENTS

| | | | |
|---|---|---|---|
| 4,525,782 A | * 6/1985 | Wohlfarth et al. | ............ 701/99 |
| 4,766,595 A | 8/1988 | Gollomp | |
| 5,123,017 A | 6/1992 | Simpkins et al. | |
| 5,442,553 A | 8/1995 | Parrillo | |
| 5,682,317 A | * 10/1997 | Keeler et al. | ............ 701/101 |
| 5,777,211 A | * 7/1998 | Binienda et al. | ............ 73/53.05 |
| 5,781,871 A | 7/1998 | Mezger et al. | |
| 6,127,947 A | 10/2000 | Uchida et al. | |
| 6,330,499 B1 | * 12/2001 | Chou et al. | ............ 701/33 |
| 6,480,810 B1 | * 11/2002 | Cardella et al. | ............ 702/188 |

FOREIGN PATENT DOCUMENTS

| | | |
|---|---|---|
| DE | 3234727 | 4/1984 |
| DE | 3110774 | 6/1985 |
| DE | 19744602 | 4/1998 |
| DE | 19853000 | 6/1999 |
| WO | 0135373 | 5/2001 |

* cited by examiner

Primary Examiner—Michael J. Zanelli
(74) Attorney, Agent, or Firm—Crowell & Moring LLP

(57) ABSTRACT

A method and system for an improved vehicle monitoring system in order to provide a cost-effective and scalable system design for industrial application through the use of machine learning and data mining technologies on data acquired from a plurality of vehicles to create models. Frequent acquisition of vehicle sensor and diagnostic data enables comparison with the created models to provide continuing analysis of the vehicle with respect to repair, maintenance and diagnostics.

26 Claims, 14 Drawing Sheets

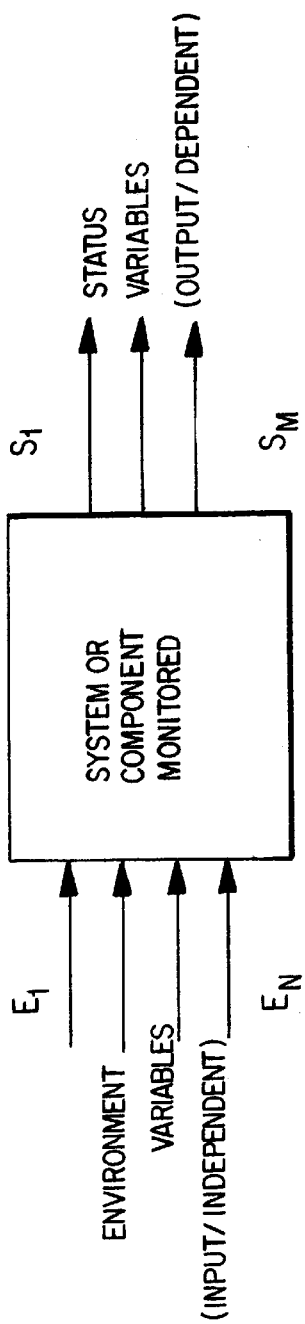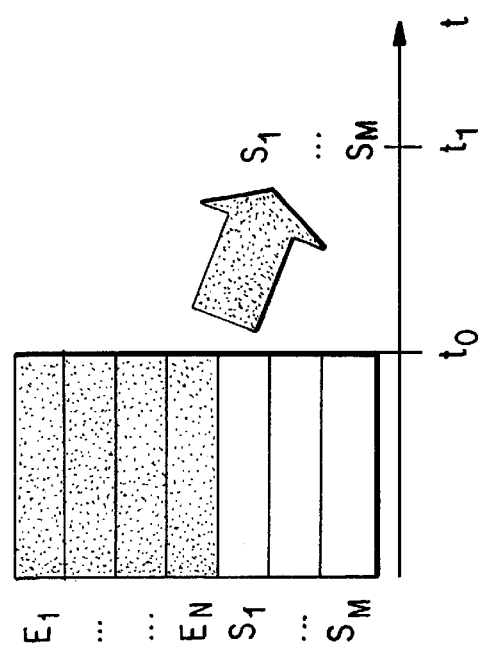

METHOD AND SYSTEM FOR CONDITION MONITORING OF VEHICLES

BACKGROUND AND SUMMARY OF THE INVENTION

The present invention, is addressed to a system and a method for an improved vehicle-monitoring system in order to provide a cost-effective and scalable system design for industrial application. Machine learning and data mining technologies are used on data acquired from a plurality of vehicles in order to create models. Frequent acquisition of vehicle sensor and diagnostic data enables comparison with the created models to provide continuing analysis of the vehicle for repair, maintenance and diagnostics.

State of the art vehicles include a variety of communication systems, control systems and safety and diagnostic systems along with their associated sensors. Examples of these systems include engine control systems, diagnostic and maintenance computers, brake and stability systems and telematics devices. Exchange of information including control, status and diagnostic messages between Embedded Control Units sensors and associated devices is accomplished with a vehicle data bus infrastructure. An example is an engine bus system such as the Controller Area Network (CAN).

The on-board diagnostic systems process sensor readings and diagnostic information of the vehicle Embedded Control System in order to detect defaults. The maintenance systems on-board the vehicle continuously process sensor readings to determine the condition of the vehicle systems, parts and lubricants (e.g., brake pad wear, battery quality, and oil quality). Off-board diagnostic systems, such as workplace testing equipment, acquire vehicle diagnostics and sensor data or control on-board diagnostics and testing functions. The system uses OEM proprietary or standardized interfaces, for example, OBD to connect to the vehicle. Physical connections link the vehicle and the workshop test equipment, with short-range wireless communication systems eventually replacing cable connections. The current state of the art with respect to tele-diagnostics provides communication features of telemetrics in order to connect vehicle diagnostics systems with off-board service centers. The vehicle sends diagnostic information in the event of a breakdown and fleet operators are then able to acquire diagnostic data for maintenance and diagnostic application.

With all of these prior art systems expert knowledge based on workshop technicians' experience or engineering knowledge for the physical or mathematical fault and maintenance models are necessary to utilize the systems diagnostics algorithms.

An object of the present invention is to provide a condition monitoring of the vehicle as an integral part of the vehicle diagnostics, maintenance and repair process. As a result of the present invention, a cost-effective and scalable system is designed which provides an industrial application whereby the use of machine learning and data mining technologies on data acquired from many vehicles provides a variety of new maintenance and diagnostics applications.

It is another object of the present invention to provide for frequent acquisition of vehicle sensor and diagnostics data and also frequent off-board analysis in order to provide for up-dated repair, maintenance and diagnostics.

The present invention provides an industrial application system infrastructure that allows for cost-effective acquisition and analysis of vehicle data for passenger cars and commercial vehicles. The present invention achieves its object by providing data analysis and knowledge generation in an approach wherein the system may use internet service applications as well as enable a new maintenance service process.

Other objects, advantages and novel features of the present invention will become apparent from the following detailed description of the invention when considered in conjunction with the accompanying drawings.

BRIEF DESCRIPTION OF THE DRAWINGS

FIG. 3 illustrates environmental variables and status variables of the analyzed system for failure mode prediction;

FIG. 4 is a system view of a generic component being monitored in accordance with the present invention;

DETAILED DESCRIPTION OF THE PREFERRED EMBODIMENTS

Figure 1:
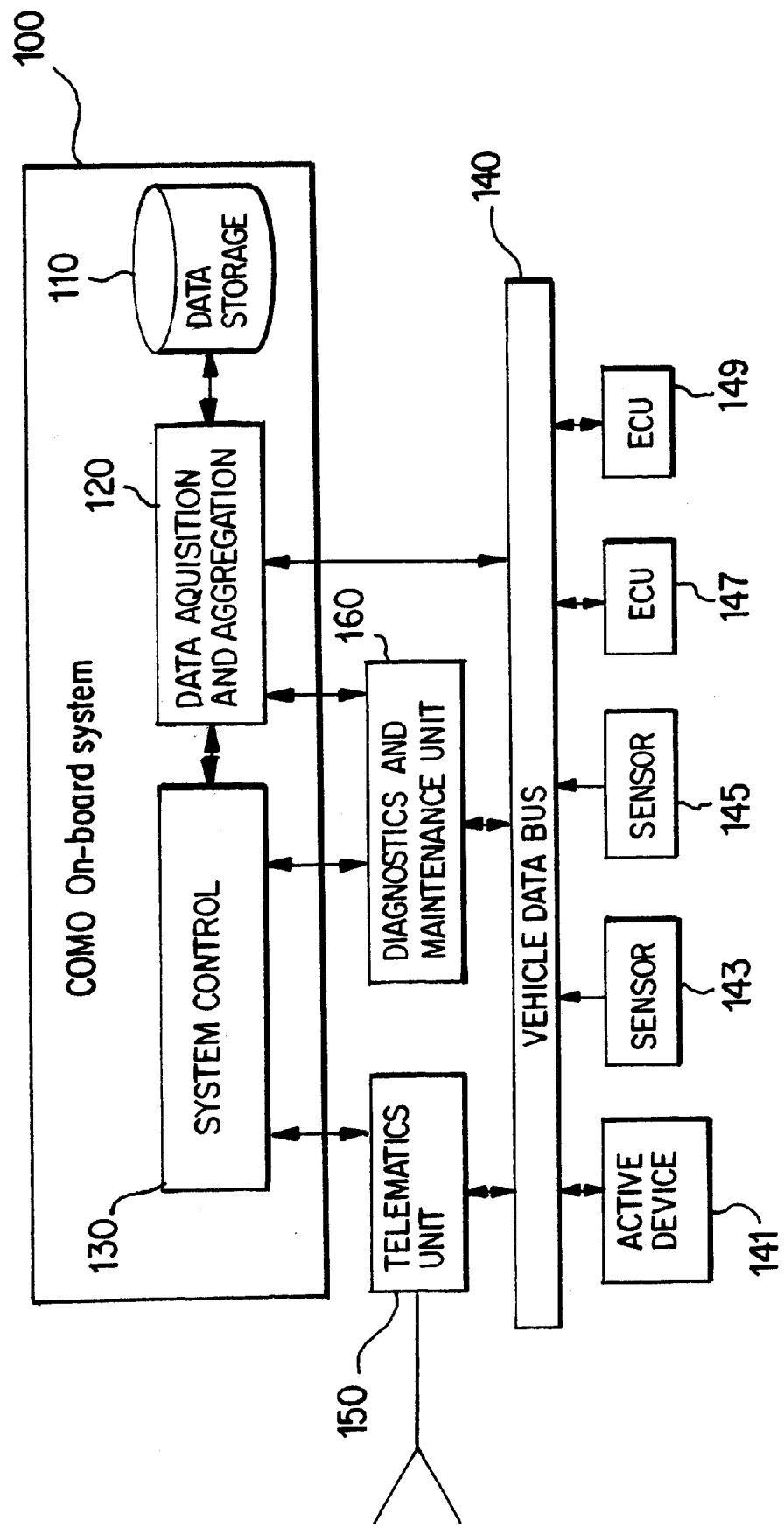
FIG. 1 is a schematic of basic architecture of the on-board system integration in the vehicle infrastructure according to the present invention.
Figure 2:
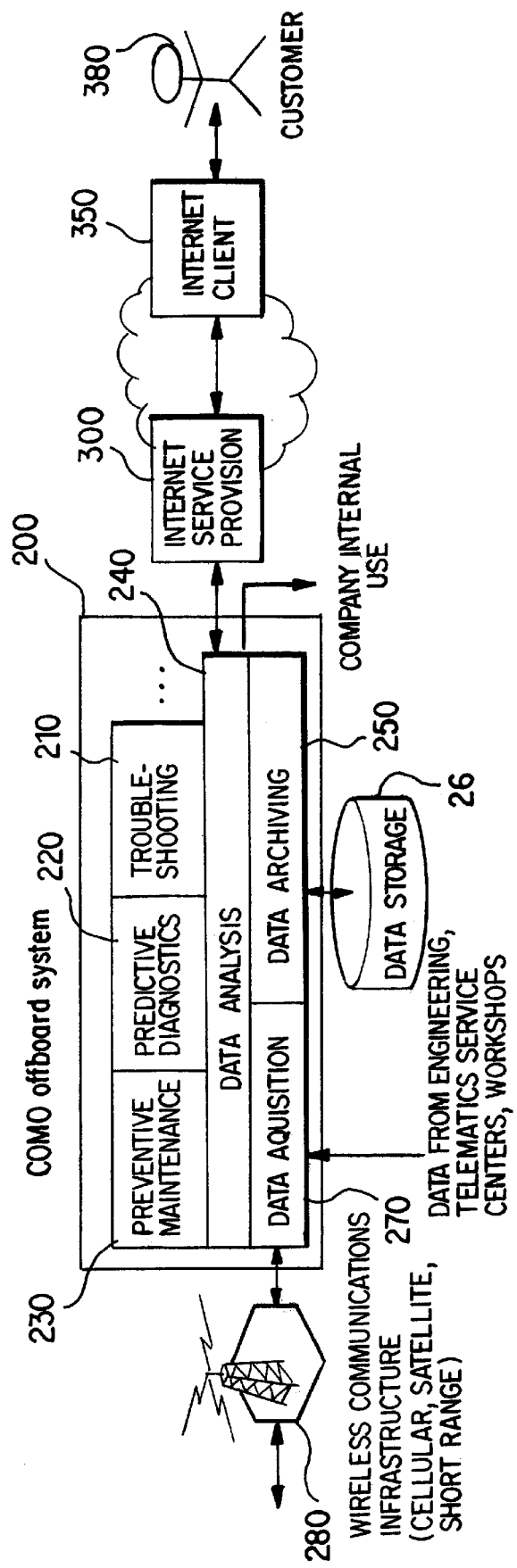
FIG. 2 is a schematic diagram illustrating the off-board system and its relationship to the vehicle data bus.

The condition monitoring system (COMO) of the present invention consists of an on-board component integrated in a customer vehicle as illustrated in FIG. 1 and an off-board component shared by many vehicles as illustrated in FIG. 2.

The on-board component is a hardware/software system accessing the data bus infrastructures and interfacing the telematics and diagnostic functions of the vehicle. The on-board component may be an embedded system with part of a vehicle central processing unit or a distributed system with software components in telematics and a diagnostics unit. On the other hand, the off-board system is an electronic data processing system able to be realized with a multi-tier backend service architecture as a single unit or distributed over several service centers. The on-board and off-board components frequently exchange data through wireless communication facilities.

The architecture of the on-board system of FIG. 1 shows a COMO(Condition Monitoring) on-board system 100 which functions with a vehicle equipped with a telemetrics communication platform 150 providing low-cost data services including, for example, cellular wireless data services (GPRS), message board satellite services (e.g., LEO 1) or short-range communication (e.g., BlueTooth). An on-dash board diagnostics and maintenance unit 160 continuously performs diagnostic and maintenance functions for processing data from the vehicle data bus 140. Many premium vehicles already have this equipment and future vehicles will provide the possibility of updating and parameterization of diagnostics software through an in-vehicle interface. The on-board condition monitoring system 100 consists of a system control module 130, a data acquisition and aggregation module 120 and a data storage module 110. In the block diagram of FIG. 1, the vehicle data bus is connected to electronic control units 147,149, sensors 143,145 and active device 141. However, the number of control units, sensors and active devices may vary depending upon the desired application. The data acquisition and aggregation module 120 acquires and processes data from sensors and electronic control units 143–149 and derives non-measurable data (e.g., by using mathematics or statistical models) and filters, processes, and aggregates, native and derived data and stores it in compressed format in a non-volatile storage 110. The system control module 130 functions to control communications control, software up-date and parameterization of the diagnostics and maintenance module 160.

One of the important features of the system control module 130 is the ability to decide when to use an anytime, anywhere communication scheme using cellular data communications or a cost-effective sometime, somewhere communication scheme using short-range communication at dedicated locations such as the driver's home or at gas stations. The module 130 is able to compress outgoing data and, when triggered by events of the on-board components or by request of an off-board component, data from the storage 110 is transferred to an off-board system using the vehicle's telematics platform 150. The telematics platform unit may use cellular or wireless systems, satellite communication or short-range wireless communication system to communicate with a fixed network infrastructure of an off-board system.

As a complement to the on-board system of FIG. 1, the off-board system of FIG. 2 interfaces to wireless communication, data storage (e.g., data base service) and Internet service provider systems. The off-board system 200 of FIG. 2 can be implemented as a distributed system using state-of-the-art middleware (e.g., CORBA, Java Enterprise Bean Container). The system interfaces with wireless communications to aid data storage 260 (data space servers) and internet service provision systems 300. The data acquisition component 270 provides data communication with the vehicles and the processing of the incoming data. The communications functions include registration and security functions as well as optimized application level communications protocols. The component provides functions to store uncompressed vehicle data and to transform data into formats suitable for backend infrastructures (e.g., XML). The system handles communications with company internet data sources (engineering test data, service center diagnostics data, workshop and dealership information). The data archiving component 250 handles application level data management and archiving functions, for example, based on data warehousing or database management systems. The data analysis component 240 provides a set of data analysis and data mining functions designed for the vehicular domain. Application components make use of the functions provided by the data analysis 240, the data acquisition 270 and the data archiving 250. The application components realize the application logic, which essentially defines when and how to run the analysis and how to process and utilize the analysis results. Also depicted in FIG. 2 are the applications that include the Preventive Maintenance 230, the Predictive Diagnostics 220 and the troubleshooting function 210. Each of these functions will now be discussed.

Wireless communication between the vehicle and the off-board system are a function of communication cost and bandwidth requirements between the vehicle and the server off-board infrastructure. The condition monitoring system, including both the off-board system 200 and the on-board system 100, is able to address the communication cost and band width factors by reducing the overall communication load by data filtering and processing algorithms running in the on-board system. Furthermore, the communications frequency is optimized for specific applications with most applications of condition monitoring being focused on detection of long-term trends and are not time critical. Therefore, it is possible to implement a communications policy that distributes communications activities over time and space. As an example, data exchange by cellular wireless may be initiated during night hours to benefit from lower communication cost rates. Furthermore, the sometime, somewhere communications paradigms can be used to select the most cost-effective communication means. As a further example, a short-range communication at the customer's home or at gas stations can be used if they are available.

The data analysis for the preventive maintenance aspect is part of the off-board system of the on-line maintenance project and focuses on the off-board analysis and evaluation of vehicle data. The system operates on the basic assumption that sensor data and information from on-board diagnostics systems are collected and monitored from an off-board site with data mining and data fusion being applied to evaluate the data, either on-line, on-demand or on-request. Results of the evaluation are used to up-date existing maintenance models available in the vehicle or to provide feedback to company internal or external customers.

However, there is an on-board diagnostic system which includes a system modeled so that, using the available sensor data, it predicts the expected time to failure or a related measure for each system or component that is monitored (e.g., brakes, cooling system, battery, etc.). The predictions are recorded along with the sensor data and data mining is used to periodically refine the predictive models for each sub-system from vehicle history and fleet data. The data analysis system combines the predictions from the different sub-systems and produces an aggregated prediction or recommendation for a preventive maintenance that can be delivered through a user interface to the driver, service center or customer assistance center.

The data analysis preventive maintenance approach of the present invention combines classical approaches to diagnostics with a machine learning approach based on data from many vehicles and information provided by telematics, service centers, workshops and engineering and testing departments. The existing classical diagnostics and maintenance systems operate using algorithms based on engineering knowledge, expert knowledge, mathematical and physical models, statistical models or artificial intelligence approaches. These algorithms are usually defined during the design of the system and the parameters are configured during deployment and adapted during operation.

During the lifetime of the vehicle, the condition monitoring system of the present invention frequently acquires and archives aggregated data from many vehicles. This history may consist of Vehicle Identification Number (VIN), timestamps, load collectives, histograms, data-traces over time or knowledge derived from on-board diagnostics and data analysis functions. Additionally, condition monitoring acquires diagnostics and maintenance data from telematic service centers, workshops (diagnostics data, repairs, maintenance state) and engineering testing departments.

Patterns for "normal vehicle behavior" and "problematic vehicle behavior" are derived by frequently processing the combined data using machine learning and data mining methods. As an example, speed, engine revolutions, engine temperature, engine torque, environmental temperature, fuel consumption and emission values are analyzed to detect normal and abnormal behavior. These patterns are used to adapt and personalize on-board system diagnostic algorithms and to enable off-board analysis for a variety of applications, including the prediction of up-coming vehicle problems and determination of vehicle maintenance status.

The condition monitoring system of FIGS. 1 and 2 enables the continuous observation of the status of each vehicle while it is operational in order to provide information with respect to the exact environmental and operational conditions under which the vehicle is being used. Because no two vehicles are the same, and almost never operate in the same environment, the accuracy of pre-deployment predictive models is always limited. As a result of different statistical and machine learning and data mining approaches, the data acquired during utilization of the vehicle is analyzed and the vehicle system predictive models are up-dated in order to allow customized predictive models based on the operating conditions of each vehicle.

Accordingly, predictive models can be installed in the vehicle or in a central diagnostic system or distributed within the vehicle. Conversely, they can also be installed off-board, distributed, or on a central server of a vehicle diagnostic and maintenance service provider (workshops, dealerships, OEM, third party). The data acquired can arrive from one single vehicle, a group of vehicles operated by a single party (commercial fleets), a class of vehicles from one or more vehicle manufacturer, or with the entire vehicle fleet coming from one or more manufacturers.

This predictive model is able to predict the expected time of failure based on usage and environmental conditions. Such a model is called a failure model. Alternatively, the model can stimulate the expected model behavior of a component thereby allowing the comparison between the actual and predictive status of the component. This model is called a nominal behavior model. Nominal behavior models provide a basis for deciding when a component should be maintained, by detecting abnormal behavior. While not necessarily all parts that behave outside of the normal range will fail and need to be replaced, it is assumed that parts which behave abnormally should be inspected.

The life cycle of a predictive diagnostics or maintenance model is based on the following steps:
1. Analyze technical systems of new vehicle and available test data;
2. Design generic predictive diagnostic and maintenance models;
3. Deploy generic predictive diagnosis and maintenance model with vehicle;
4. Collect data from vehicle during utilization of vehicle;
5. Analyze collected data using machine learning, data mining or statistical techniques;
6. Refine existing predictive model accordingly;
7. Provide feedback to vehicle and vehicle operator until vehicle is recycled;
8. Incorporate feedback from individual vehicles into generic models until vehicle generation is out of service; and
9. Up-date techniques to create generic models for next vehicle generation.

In order to create a failure mode, an objective measure of a "failure" or a "maximum life expectation" must be available. This failure model is based upon data resulting from actual failures. However, because failures are rare and the goal of preventive maintenance and predicted diagnosis is precisely to make them even more rare, the amount of data on which to base the model is limited and is likely to result in less accurate models. On the other hand, data concerning the normal behavior of components, required for a nominal behavior model, is plentiful. Thus, accurate nominal behavior models can be generated using well-established data mining techniques because of the availability of sufficient data.

The monitoring of the generic component is depicted in FIG. 3 wherein independent environmental variables (E) and a set of dependent status variables (S) of the analyzed system from a start time $t_0$ to a given (current) time $t_c$ are used in order to predict the set of status variables at a time $T_s$ in the future, as indicated in FIG. 4. In order for the prediction to be useful for preventive maintenance, it must be well in advance, i.e., $t_F > t_c$. The outcome of this type of model is typically the time of failure $t_F$.

Figure 5:
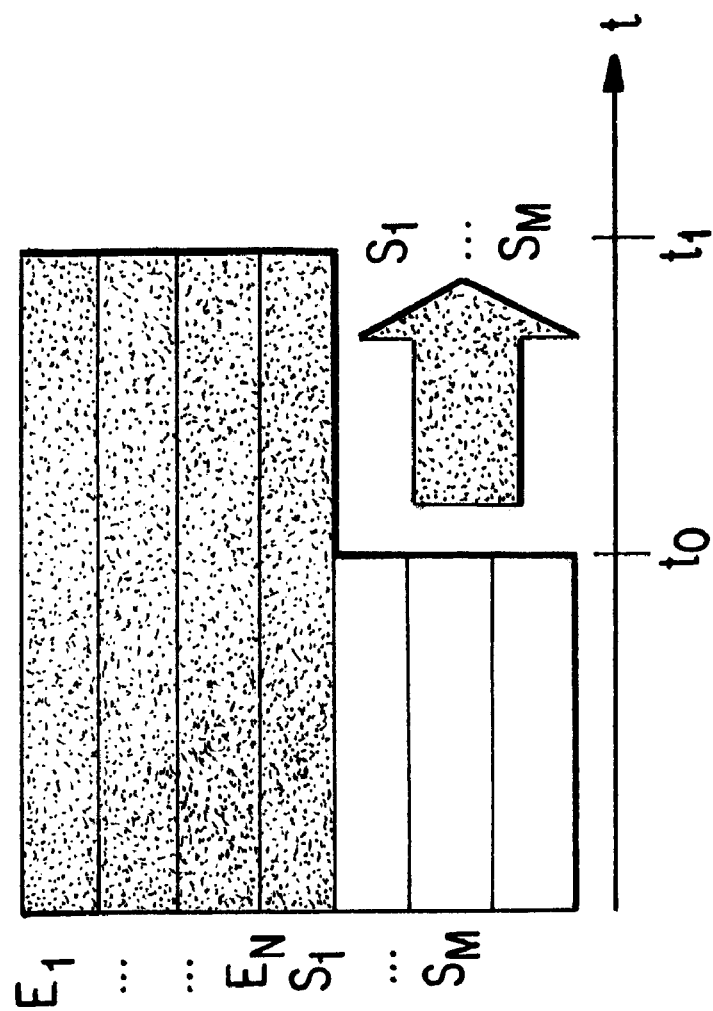
FIG. 5 is an illustration of the prediction made by the nominal behavior mode using status variables up to a certain predetermined time.

The goal of the nominal behavior model is to detect an abnormal behavior, which signals a developing problem. The model then predicts the values for the status variable at the current time and, by comparing them with the actual values of the status variables, evaluates the performance of the system. A nominal behavior model therefore utilizes environmental variables up to the present time ($E(t_0 t_c)$). Additionally, this nominal behavior model also uses the status variables up to a certain time $t_1$ before the time $t_c$ as shown in FIG. 5. The time difference between $t_c$ and $t_1$ is the prediction window and depends on the analyzed system. It is necessary for it to be short enough to reliably detect a behavior discrepancy yet long enough for the prediction to be useful.

Different scenarios for model generation and revision can be devised as a function of the combination of data sources (single vehicle, multiple vehicles), the location of the predictive system (on dashboard, off dashboard, centralized, distributed), the location of the data analysis system (learning system) and the type of predictive model used.

When an onboard predictive diagnostic system is used and data comes from a single vehicle, the developed system updates the parameters of the pre-deployment predictive model by learning new parameters through observation of the behavior of the vehicle when it is operational and functional, as will now be discussed.

By analyzing fleet data off-board, predictions regarding the quality of vehicles of certain production date can be made and new predictive models can be generated. These models can be uploaded to each individual vehicle either by means of the wireless communications or during the next scheduled maintenance.

In order to carry out the monitoring operation with wireless interfaces for transmission of data, parameters must be defined for monitoring the wear of individual components, which can be a time consuming and expensive operation. That is, the parameters are required to be defined by a time consuming series of experiments with respect to the component subject to wear. These components may have a long service life, therefore leading to a significant amount of time and expense and resulting in the problem that the fleet information cannot be used to adapt the parameter.

Accordingly, efficient data compression of the operating load through the use of load aggregates has been developed, which is also used for the subsequent monitoring of the wear and the use of off-board data processing for initial parameterization and adaptation of the model parameters. This provides simple detection of the operating load and mapping of the wear through the use of these load aggregates without expensive and time consuming test runs for initial parameterization of the wear models. When the wear parameters change, deviations can be quickly recognized and the model parameters can be adapted.

Figure 6:
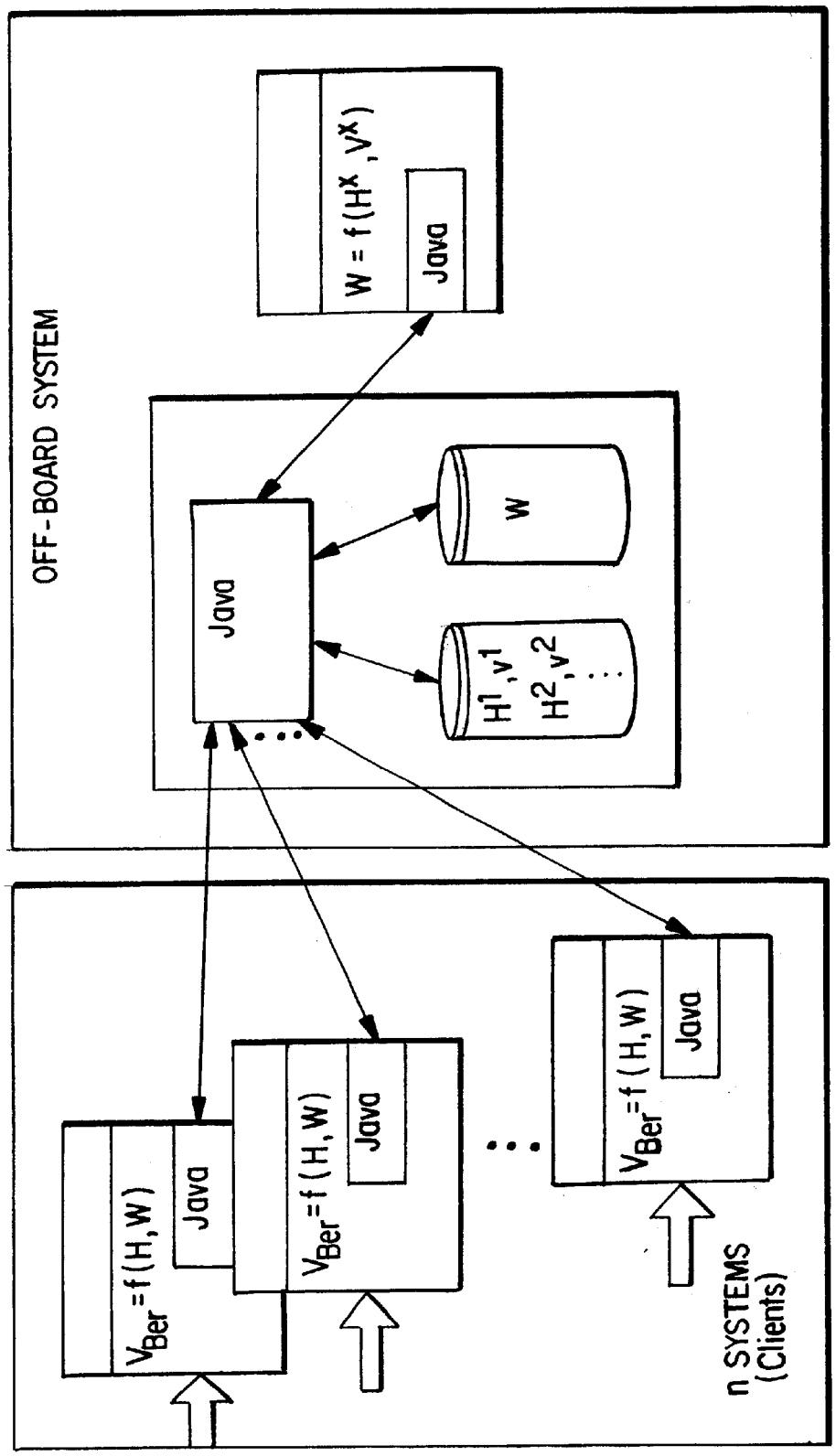
FIG. 6 is an overview of the client/server structure and the database link surface on the surface side.

FIG. 6 provides a system overview of the client/server structure and the database links on the server side. Each client represents a system to be monitored (vehicle) in which the "real" wear of a component is modeled by means of a non-linear, two-dimensional performance graph. The wear is monitored by a 10×10 load aggregate which includes 100 elements in the matrix of the example of FIG. 6 and which is connected parallel to the "real" wear.

With this approach, the load aggregate is parameterized in the operating mode so that, after the individual client/machine has been completely worn out, it transfers real wear v and the stress H in the form of load aggregates to the server database. When there are sufficient data sets, the evaluating system can be used to determine and/or improve the evaluation weighting W of the load aggregates or adapt the evaluation weighting to the changing conditions. The wear simulation and parameter identification were realized with the known functionalities of Matlab/Simulink. In order to convert the intersystem client/server communication and the database link, the Java functionality, which is available from version 6 of Matlab and which permits, for the first time a "mixed programing" of Java and Matlab code, was used. Table 1 provides an example of a Matlab function (M file), which operates in response to the server database by way of Java commands in order to store the generated data sets of each client in the database.

TABLE 1

Matlab Function with Java Code

```
function return Val=_aggregate load aggregate(LK_NAME,H,v)
    db=org.DB.ExternalDatabase.openDatabase ('db:remote:/
    servername:port') :if~isempty(db)
        LKList-db.objectForName (LK_NAME;
        LK1=db.createObject('load aggregate" ,3);
```

TABLE 1-continued

Matlab Function with Java Code

```
        java_H(10,10)=java.lang.Double(0); typeconversion for
        i - 1:10
            for j= 1:10
                java_H(I,j)=java.lang.Double(H(i,j));
                    %JAVA-type coversion
            end    %j-loop
        LK1.setK(Java_H) : % enter the entire load aggregate
        LK1.set Wear(java.lang.Double(v)) ;% enter the wear
        LKListe.add(LK1); % load agggregate
    db:close;
end % no database exists
```

These load aggregates consist of the frequency distribution of the input values to be monitored. Thus, they show the amount of stress measured and its frequency and the load aggregates are appropriate primarily for arithmetically estimating the service life and for checking the measurements. There are, in theory, various options for measuring the continuous input values (e.g. the peak count, the instantaneous value count, the class limit overrange count). Most particularly, however, the one-dimensional or multidimensional instantaneous value count is appropriate for evaluating the state of components subject to wear.

Figure 7:
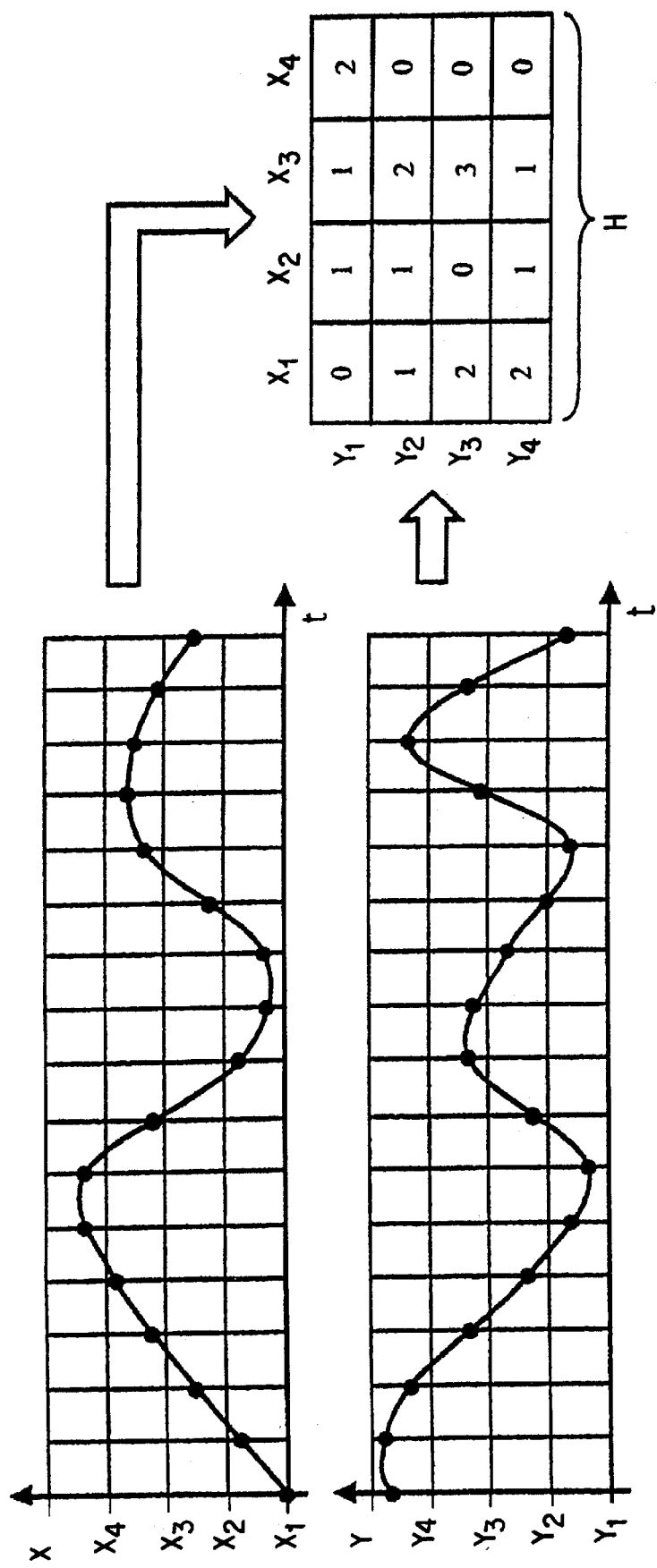
FIG. 7 is an illustration of a two dimensional instantaneous value count for measuring the continuous input values.

With respect to the instantaneous value count, the variables are measured at a fixed scanning time To while the matrix element h, which corresponds to the input values, is raised to a frequency matrix H which, as shown in FIG. 7, shows a two dimensional instantaneous value count.

This particular count method has several features:

the simultaneous stay of variables in one class counts;

the count amplitude represents the entire dwell time in the classes;

the reference to the time scale is eliminated; and the classification results in a quantification of the variables.

In this way, high data compression is achieved and, at the same time, relevant information (total dwell time) in a defined operating state (e.g. high speed at average pressure) is extracted.

With respect to an estimate of the wear of components, the size of the stress and its frequency is of primary interest. An algorithm for evaluating a load aggregate and thus estimating the service life can be derived if the following idealized approximations are assumed:

1. The chronological sequence of the operating states is irrelevant, i.e. an operating state has the same effect on the wear irrespective of the point in time;

2. The continuous operating states may be divided into classes, i.e. the operating states may be replaced by the corresponding midpoints of the classes; and 3. For each matrix element h there is an evaluation weighting W, with which the static and dynamic operating mode can be evaluated with adequate precision.

Under these conditions, the total wear v of the two dimensional load aggregate is obtained by a summation of the individual evaluations of all the classes as shown in equation 1 resulting from the multiplication of the respective frequency input $h_{ij}$ with the evaluation weighting $w_{ij}$.

$$v = \sum_{i/}^{n} \sum_{j/}^{m} w_{ij} \; h_{ij} \; w_{1,1} \; h_{1,1} \; w_{1,2} \; h_{1,2} \; \ldots \; w_{n,m} \; h_{n,m} \quad \text{(equation 1)}$$

With this wear information, the optimal time of maintenance can be determined by means of the history and planned use.

From the total wear obtained from equation 1, and from a plurality of data sets, a redundant equation system (equation 2) is generated. In order to determine the evaluation weighting W, the known regression methods, such as the least square (RS) and the recursive least square method (RLS) are used.

$$\begin{aligned} v^1 \quad & h^1_{1,1} \; h^1_{1,2} \; \ldots \; h^1_{n,m} \; w_{1,1} \\ v^2 \quad & h^2_{1,1} \; h^2_{1,2} \; \ldots \; h^2_{n,m} \; w_{1,2} \\ & \vdots \quad \vdots \quad \quad \vdots \quad \vdots \\ v^K \quad & h^K_{1,1} \; h^K_{1,2} \; \ldots \; h^K_{n,m} \; w_{n,m} \end{aligned} \quad \text{(equation 2)}$$

In order to determine the evaluation weighting W, at least as many linear independent equations (wear data sets) are needed as there are evaluation weightings. Therefore, to compensate for statistical errors, 3 to 5 times the quantity of data sets is recommended. Thus, a plurality of data sets is necessary for the initial parameterization or for the adaptation in order to determine with adequate accuracy the evaluation weightWing W. The result of the mapping in equation 3 is a reduction in the classes for each dimension from $x_i$ to $x_j$ (i:1 ... N equals number of dimensions).

$$T : HR^{x1, x2, x3 \ldots xN} HR^{1, 2, 3 \ldots N} \quad \text{(equation 3)}$$

Therefore, the size of the existing load aggregates H is reduced by Equation 4 so that with only a small number of data sets, the reduced evaluation weighting W can be determined by the least squares (LS) method.

$$HT(H) \quad \text{(equation 4)}$$

Once the reduced evaluation weighting W has been determined the mapping in Equation 5 results in a transformation (Equation 6) back to the original size of the evaluation weighting W.

$$U : WR^{1, 2, 3 \ldots N} WR^{x1, x2, x3 \ldots xN} \quad \text{(equation 5)}$$

$$WU( ) \quad \text{(equation 6)}$$

The consequence of such a transformation is that a 10×10 load aggregate with 100 elements can be reduced to a 3×3 load aggregate with 9 elements and therefore a smaller number of linearly independent equations is required for the determination.

Figure 8:
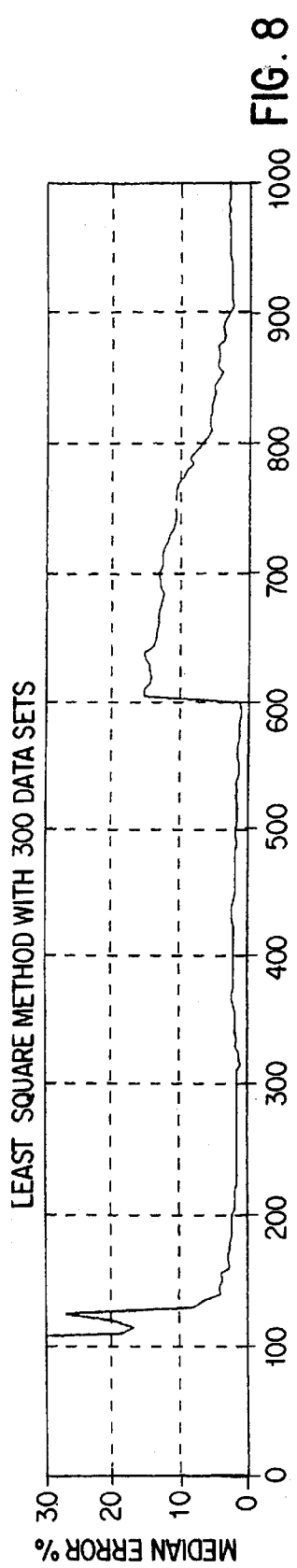
FIG. 8 provides simulation results of initial parameterization and model adaptation.
Figure 8A:
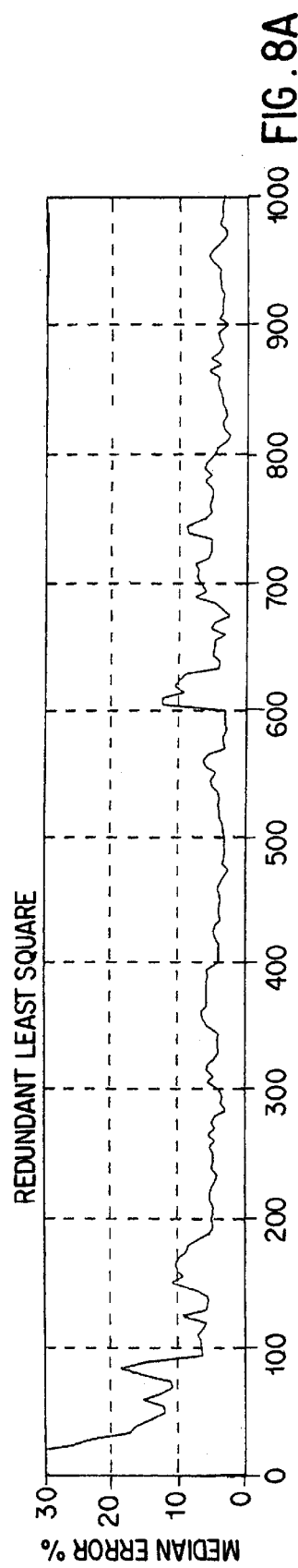
Figure 8B:
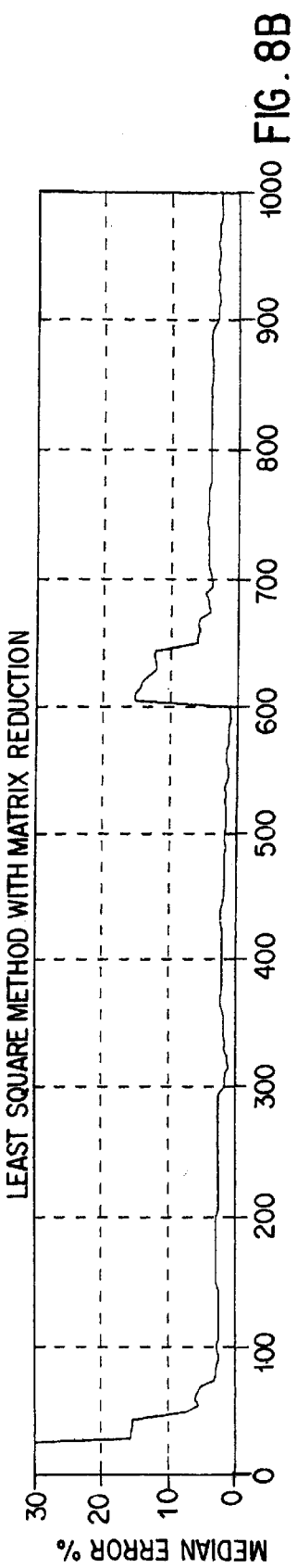

An application of the above method was a simulation study based on 1000 load aggregates with related wear values. In order to show adaptability, the wear parameters of the system being monitored were changed starting from the $600^{th}$ data set. The quality of the found evaluation weighting was evaluated by external data sets and plotted over the number of wear data sets as shown in FIG. 8 as the percent mean error.

TABLE 2

Feature Engineering for the analysis of the cooling data in Predia

| ORIGINAL FEATURES | | COMPUTED FEATURES | |
|---|---|---|---|
| V | Vehicle Speed | $V_{10}$ | Filtered Vehicle Speed (10% reduced) |
| n | Engine Revolutions per Minute | $n_{15}$ | Filtered engine revolutions per minute (15% reduced) |
| M | Engine Torque | $M_1$ | Engine Torque, filtered with 1%, squared and averaged over 40 data points |
| | | $M_{25}$ | Engine Torque, filtered with 25%, averaged over 40 data points |
| $T_E$ | Environment Temperature | $T_E$ | Environment Temperature |
| $P_E$ | Atmospheric Pressure | H | Altitude (calculated to be $(-11 * P_E) + 11600$ and averaged over 40 data points) |
| $T_{CW}$ | Cooling Water Temperature | $T_{cw}$ | Cooling Water Temperature Averaged over 40 data points |

The least squares (LS) method (estimation horizon 300 data sets), the redundant least square (RLS) method with error controlled for getting factor, and the LS method (estimation horizon 300 data sets) with matrix reduction were used as the parameter estimation methods. The dimensional size of the reduced matrix is controlled as a function of the number of existing data sets.

With three-fold redundancy of the reduced equation system, the fastest convergence behavior (FIG. 8), with respect to the initial parameterization of the load aggregates, was achieved by matrix reduction. Even when the wear parameters were changed (starting from data set 600), the matrix reduction method provides better results than the LS method with estimation horizon because it does not converge until after the estimation horizon of 300 data sets. The RLS method generates the smallest error during adaptation (600–650 data sets). However, a comprehensive survey revealed that the error of the RLS method was eventually higher than that of the two LS methods.

EXAMPLE

In order to demonstrate the condition monitoring, data was collected from cooling systems from various Actros trucks for creating a model to detect if the cooling system of the truck is functioning normally and to predict upcoming failures. Previous attempts to create a predictive model based on a engineering analysis had failed due to the complexity of the system. However, utilizing the nominal behavior model of the present invention for the cooling fluid temperature based on an artificial neural network, an initial model was created, revised and adapted to other trucks through model refinement. The data available contains the vehicle speed (V), the engine revolutions per minute (n), the engine torque (M), the environment temperature ($T_E$), the atmospheric pressure ($T_E$), and the cooling water temperature ($T_{CW}$) with a resolution of three seconds (20 measurements per minute). The data was obtained from the CAN-bus (controller area network) in the vehicle and pre-processed to convert this data into a form which represents actual physical properties. Fifty-four thousand data points were obtained for four different truck types (1840, 1857, 2543, 2653). The data contains only measurement for cooling systems in working order with no data for a faulty cooling system. Therefore, the approach in this example was limited to creating a nominal behavior model for the cooling system.

A neural network was created to predict the temperature of the cooling fluid similar to the approach in FIG. 4. Once installed in the truck, the system provided an error message whenever the predicted and actual cooling water temperature differed from a set limit. The data being utilized was previously analyzed in another project called the PREDIA PROJECT wherein the resolution was decreased to nine seconds. In order to smooth the data, a filtering function which decreases the difference between two consecutive data points by a given percentage was used ($X_{1new}$ equals $x_0+(x_1-x_0)\star y\%$). To incorporate time day series effects, attributes which average the data over forty data points were introduced. The revised input data set summary is shown in Table 2. The results generated by the neural model network contain 21200 data points with a nine-second resolution, which is also the data that was used to train the network, i.e. these results are results on the training set.

Figure 9:
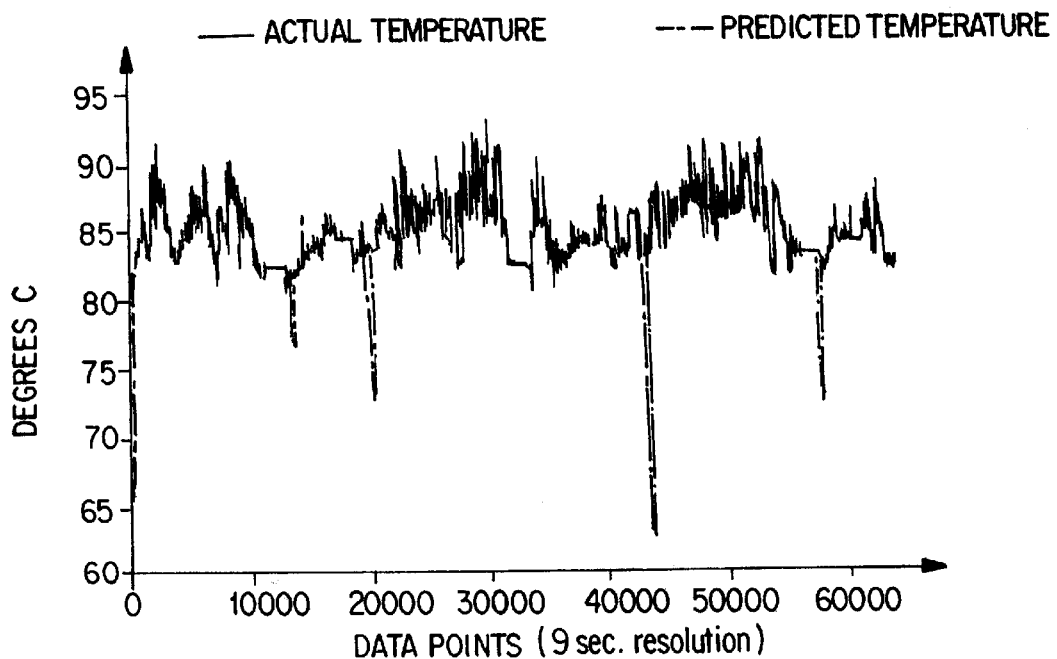
FIG. 9 is a prediction graph comparing measured cooling water temperatures with predictions for cleaning system of an Actros truck.

The model determined a nominal temperature for 5054 points or 23.8 percent of these data points. The resulting prediction graph is shown in FIG. 9. The dark lines show the actual, measured cooling water temperature ($C_{cw}$), and the bright line-segments are the predictions that the neural network model was delivering given the operating conditions of the vehicle. The predictions were given for the current point in time, i.e. the nominal behavior for the current situation was calculated.

Figure 10:
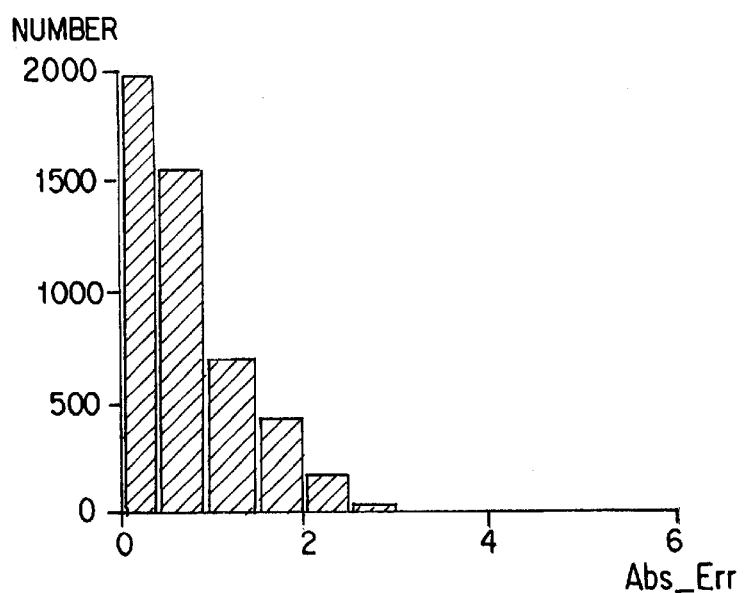
FIG. 10 provides a prediction error range distribution of FIG. 9.

With respect to the data points for which the system was able to make a prediction, the maximum error was 5.15° C. and the mean error was 0.778° C. The error was below 1° C. for 71.3% of the points, below 2° C. for 94.9%, and below 2.5° C. for 98.7%. The error range distribution is shown in FIG. 10.

Therefore, for 23.8% of the data points it was possible to predict the temperature of the cooling fluid to a precision of 2.5° C. based on the results of the training set.

A prolonged deviation of the temperature of the cooling fluid would indicate a problem and the need for preventive maintenance. Because the characteristics of the cooling system are complex, they may change from one vehicle to another. While creating a generic model to predict the cooling temperature for a class of trucks may yield acceptable results, the generic model must be refined using cooling system data coming from each respective truck. The current cooling fluid temperature of a truck depends on the recent history regarding the environmental variables (engine operating condition) as well as previous cooling fluid temperature. Because the temperature of the cooling fluid is a property that does not change rapidly, there is a delay between the change in the environmental variables and the effects on the cooling fluid temperatures.

The goal of the experiment was to generate a predictive nominal behavior model for the cooling water temperature. If the temperature deviates from what would be expected given the engine operating conditions, it is necessary to detect such deviation, especially if it is prolonged. In order to provide a predictive nominal behavior model, an analysis on the same data set was used as in the Predia Project but with a reduction of a time resolution of three second for the data while keeping the initial number of data points. The data was filtered to remove invalid and blank data, and measurements were removed where the vehicle was not moving and the engine was off (V,n and M=0). Measurements were also removed where data was missing in one or more fields and data sets were removed which were obviously flawed i.e. having values of V greater than 200 km/h, N greater than 3000 rev/min and M greater than 500 Nm. What remained were 34,292 data points for the 1840 and 54,920 data points for the 1857 model truck.

Figure 11:
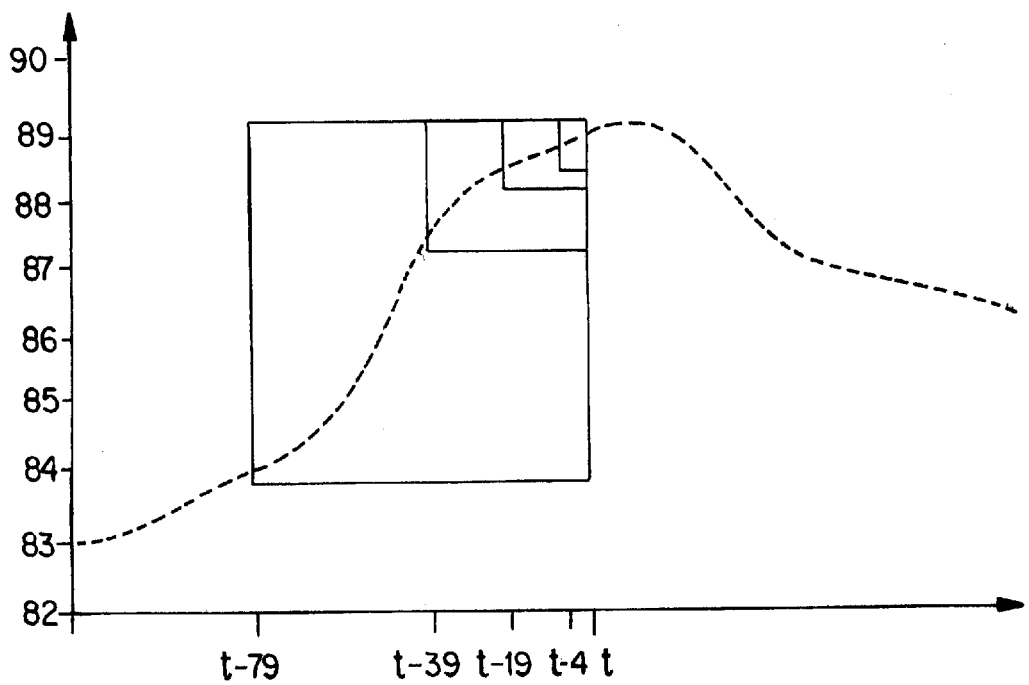
FIG. 11 illustrates floating average data windows for various times before a current data point.

In the next step, four sets of floating averages were calculated for all available data except for the cooling water temperature, taking into account the last 5, 20, 40 and 80 data sets, i.e. 15 seconds, 1 minute, 2 minutes and 4 minutes before the current data point, as shown in FIG. 11. Areas where the largest window contained a transition area that was previously created due to the removal of invalid data points were skipped. A summary of the features used as input to the predictive model is listed in Table 3. The floating average calculation for the cooling water temperature was accomplished by using the data up to 20 data points (1 minute) before the current data point. The windows started from t-79 and t-39 and went up to t-20. The desired output of the model is the cooling water temperature at the current time-step. Therefore, the network forms a predictive model of the form depicted in FIG. 4. The one-minute gap between the last value of the cooling temperature used as input as a prediction ensures that significant deviations can be detected.

TABLE 3

Feature Engineering for the Summarized History Data Approach

| ORIGINAL FEATUREST | | COMPUTED FEATURES | |
|---|---|---|---|
| V | Vehicle Speed | $V_t$ | Vehicle Speed at t |
| | | $V_5$ | Average of the last 5 data points |
| | | $V_{20}$ | Average of the last 20 data points |
| | | $V_{40}$ | Average of the last 40 data points |
| | | $V_{80}$ | Average of the last 80 data points |
| n | Engine Revolutions per Minute | $n_t$ | Engine revolutions per minute at t |
| | | $n_5$ | Average of the last 5 data points |
| | | $n_{20}$ | Average of the last 20 data points |
| | | $n_{20}$ | Average of the last 40 data points |
| | | $n_{80}$ | Average of the last 80 data points |
| M | Engine Torque | $M_t$ | Engine Torque at t |
| | | $M_5$ | Average of the last 5 data points |
| | | $M_{20}$ | Average of the last 20 data points |
| | | $M_{40}$ | Average of the last 40 data points |
| | | $M_{80}$ | Average of the last 80 data points |
| $T_E$ | Environment Temperature | $T_{Et}$ | Environment Temperature at t |
| | | $T_5$ | Average of the last 5 data points |
| | | $T_{20}$ | Average of the last 20 data points |
| | | $T_{40}$ | Average of the last 40 data points |
| | | $T_{80}$ | Average of the last 80 data points |
| $P_E$ | Atmospheric Pressure | $P_{Et}$ | Atmospheric Pressure at t |
| | | $P_5$ | Average of the last 5 data points |
| | | $P_{20}$ | Average of the last 20 data points |

TABLE 3-continued

Feature Engineering for the Summarized History Data Approach

| ORIGINAL FEATUREST | | COMPUTED FEATURES | |
|---|---|---|---|
| | | $P_{40}$ | Average of the last 40 data points |
| | | $P_{80}$ | Average of the last 80 data points |
| $T_{CW}$ | Cooling Water Temperature and t-20 | $T_{CW40}$ | Average Cooling Water Temperature between t-39 and t-20 |
| | | $T_{CW80}$ | Average Cooling Water Temperature between t-79 and t-20 |

The results on two data sets pertaining to two truck models, the 1840 and the 1857 Actros series are noted in Table 4. There were approximately 40,000 valid data points for each model. The neural network was trained on half of the data using a standard back propagation learning algorithm. The network was then evaluated using the remaining data.

TABLE 4

Results of the 1840 and 1857 Actros truck data

| Data set | Number of data points | Mean Absolute Error | Sdev Absolute Error | % Predictions within 1_C | 2_C | 2.5C |
|---|---|---|---|---|---|---|
| 1840 | 34292 | 1.08 | 2.29 | 71.0 | 91.2 | 94.9 |
| 1857 | 54920 | 0.59 | 0.78 | 84.6 | 91.2 | 94.9 |

Figure 12:
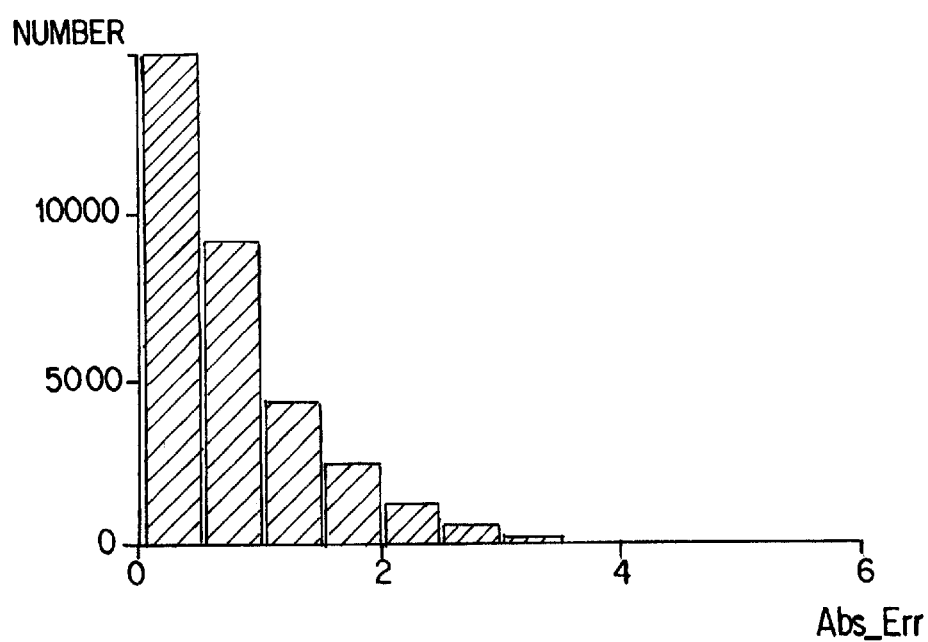
FIG. 12 is a distribution of the absolute prediction error on the Actros truck model 1840 data set.
Figure 13:
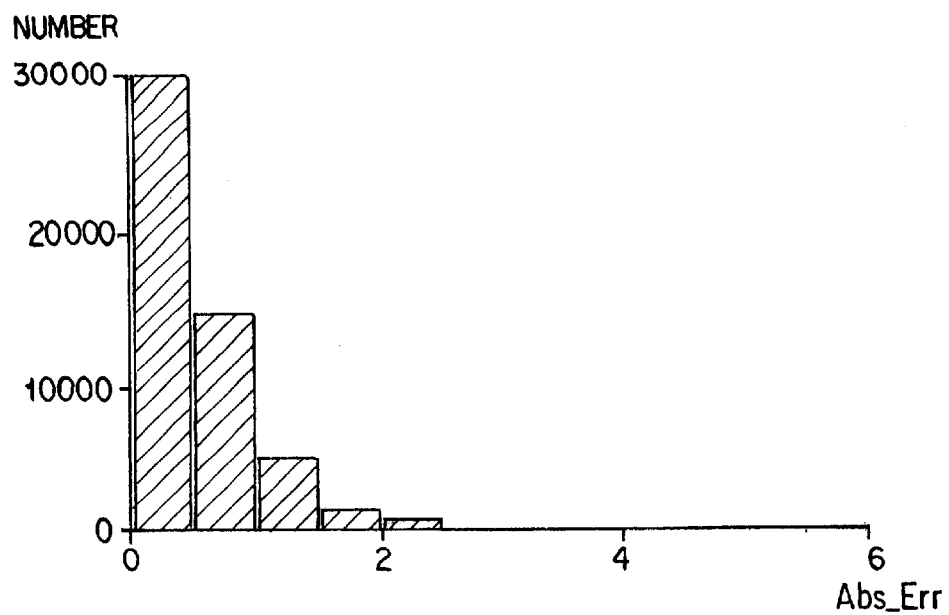
FIG. 13 is a distribution of the absolute prediction error on the model 1857 Actros truck data set.
Figure 14:
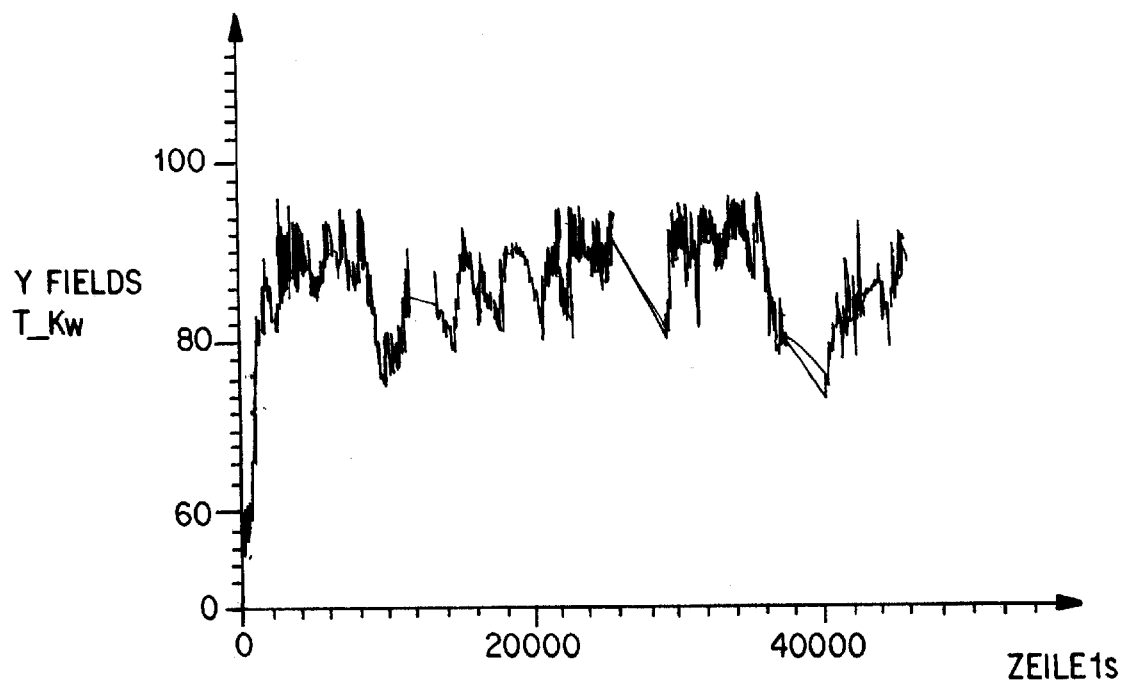
FIG. 14 is a comparison of actual versus predicted cooling system temperature for the model 1840 Actros truck.
Figure 15:
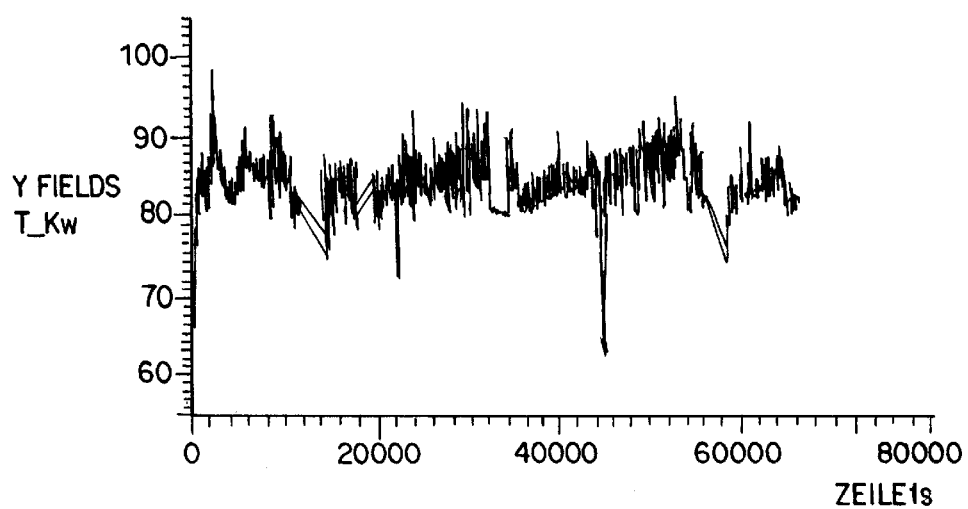
FIG. 15 is the actual versus predicted cooling system temperature for the model 1857 Actros truck.

The FIGS. 12 and 13 show the distribution of the absolute error in the predictions and FIGS. 14 and 15 illustrate how closely the temperature predicted by the model matches the actual temperature.

The normal behavior of the cooling system will vary slightly from truck to truck. In order to obtain the best possible nominal behavior model for a truck it is important to build the model using data collected from that particular truck. However, in general, the amount of data needed to build a sufficient model from the very beginning, may be very large. In practice, it might be difficult or costly to collect enough data for trucks. Therefore, an alternative based on model refinements was explored. Instead of building a model from scratch for each vehicle, a generic model was constructed first from a large amount of data collected from a number of trucks of the same type. The generic model was then refined or fitted to the individual trucks using only a small amount of data from each truck. The data for this test did not distinguish between different trucks of the same model or type. As a result, data from the 1840 and 1857 Actros series was used as a substitute for data from different trucks of the same type. The predictive model built from the 1840 data set was used as the generic model and "refined" with data from the 1857 trucks. The refined model was obtained by retraining the neural network built from the 1840 data using a subset of the original 1840 data in addition to increasing amounts of data from the 1857 trucks. The refined network was then evaluated on the full 1857 data set. Retaining a portion of the original data in the refinement phase ensures that the learning procedure does not overfit the neural network to the new data.

The results of the refinement task are summarized in Table 5 which shows the performance (on the 1857 data set) of the refined network using varying amount of data from the 1857 trucks and compares it to the performance of a model built from scratch using the 1857 data only. Additionally, the table shows the performance of the original, unrefined model on the 1857 data set.

TABLE 5

Results on the refinement task

| | Amount of 1857 data | Mean Absolute Error | Sdev Absolute Error | % Predictions within 1° C. | 2° C. | 2.5° C. |
|---|---|---|---|---|---|---|
| Refined Model | 1000 | 1.70 | 1.38 | 37.0 | 67.0 | 76.3 |
| | 2000 | 1.45 | 1.34 | 48.3 | 72.1 | 79.9 |
| | 5000 | 1.35 | 1.49 | 55.9 | 77.7 | 83.2 |
| | 10000 | 0.95 | 1.03 | 65.3 | 88.9 | 93.8 |
| Model built from scratch | 1000 | 2.31 | 2.20 | 37.7 | 57.9 | 64.8 |
| | 2000 | 2.26 | 2.32 | 42.0 | 60.4 | 66.5 |
| | 5000 | 1.94 | 2.71 | 49.9 | 73.0 | 77.4 |
| | 10000 | 0.94 | 1.09 | 68.0 | 88.9 | 93.4 |
| Unrefined Model | — | 1.73 | 1.56 | 42.7 | 66.4 | 74.3 |

Figure 16:
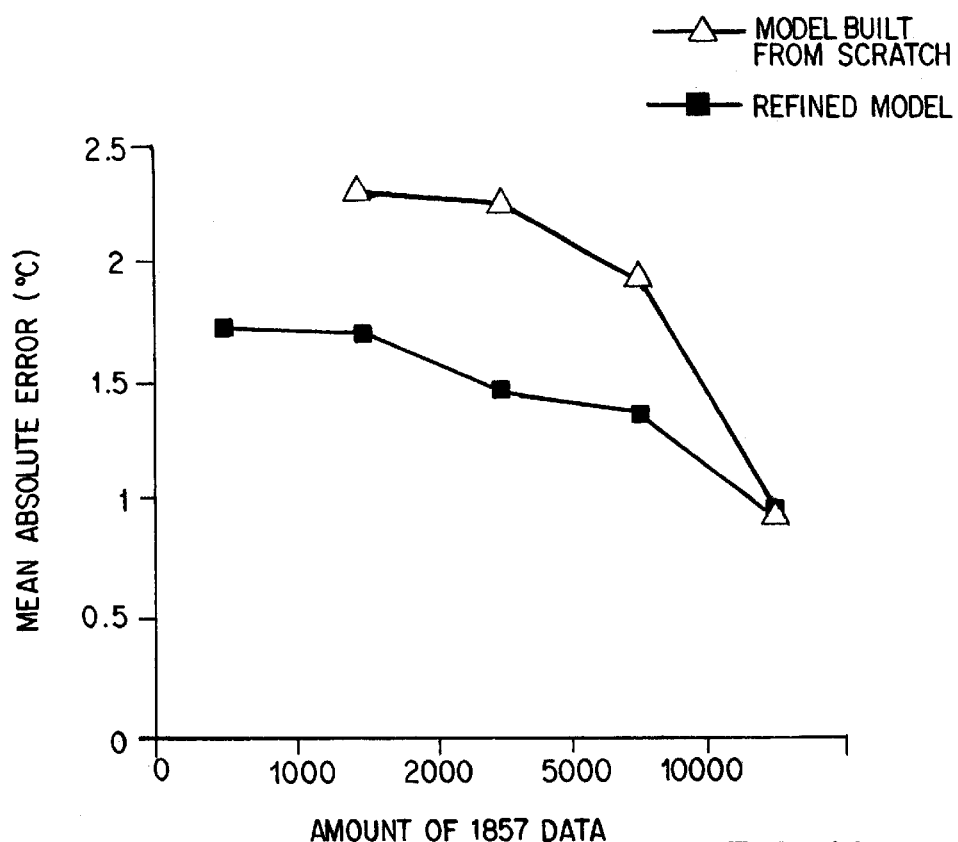
FIG. 16 is a comparison of a refined model versus a model built from scratch for a model 1857 truck.

The mean absolute error of the refined model evolved as more new data is used, as shown in FIG. 16. This figure also shows how the absolute error compares to the error of a model built from scratch using only the new data. The accuracy of the model increases when more data is used and when even little data is available, the refined model significantly outperforms the model built from scratch.

Figure 17A:
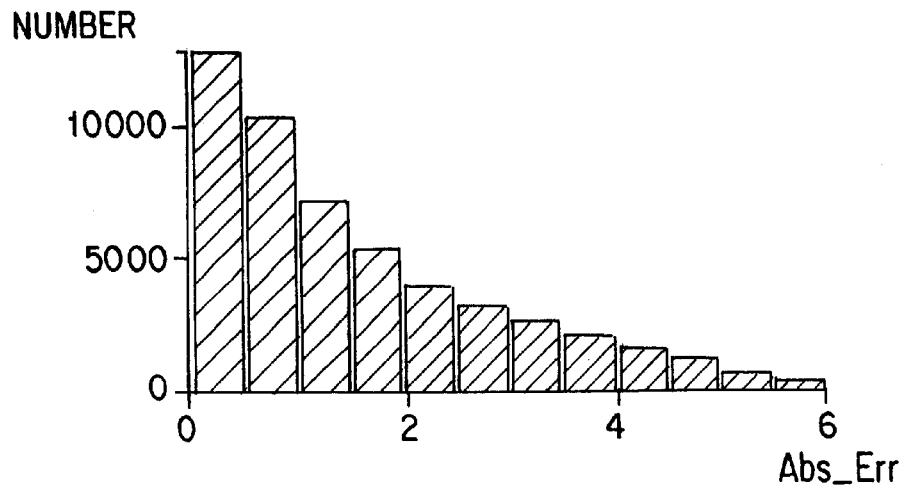
FIGS. 17(a) and (b) provides a comparison of the distribution of the absolute prediction error before and after refinement analysis.
Figure 17B:
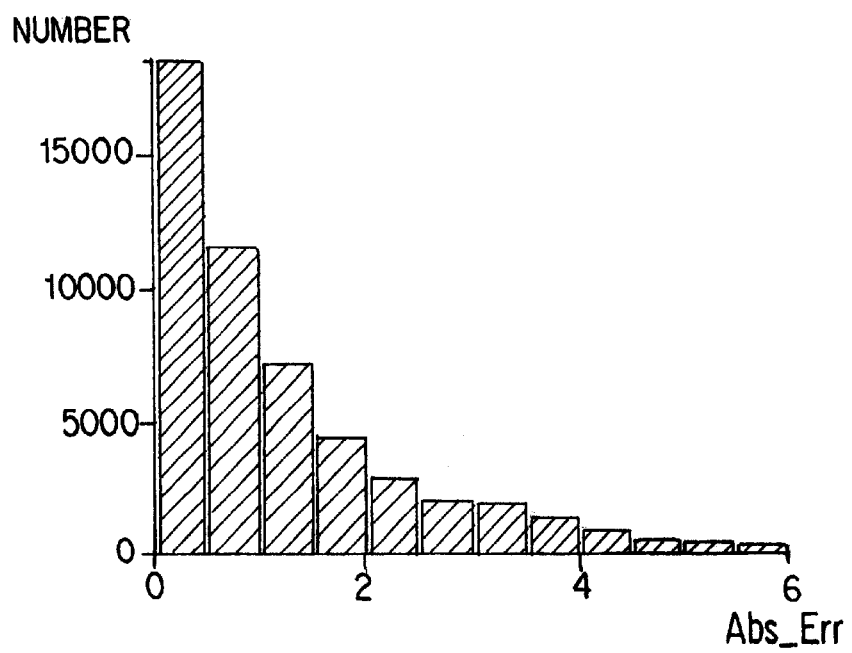

Because the characteristics of the 1840 trucks are significantly different from that of the 1857 trucks, the original, unrefined model (built from the 1840 data) performs poorly on the 1857 data. FIGS. 17a and 17b contrast the absolute error of distribution of the model before and after refinement. When starting with a better performing model, built from vehicles with the same characteristics as the target vehicles, the benefits of the model refinement approach over the start from scratch approach would be even greater.

The condition monitoring method of the present invention provides applications not only in preventive maintenance but also in the previously discussed predictive diagnostics, internet based maintenance and repair services and improved troubleshooting, based on road travel experience of the vehicle.

The ability to determine the vehicle maintenance status remotely allows for workshops and dealerships to actively support customers when maintenance is due and it enables fleet management services to be provided to fleet customers, such as taxis or rental cars, which help reduce maintenance costs by scheduling maintenance intervals based on actual usage. Furthermore, workshops can optimize utilization of their plant and are able to plan material logistics by predicting upcoming maintenance volumes. Furthermore, OEM's are able to sell the knowledge about vehicle status to external workshops and service providers and to increase customer satisfaction by providing user based personalized maintenance service.

The on-board and off-board data processing is used to determine the maintenance status of a vehicle with the vehicle continuously processing sensor information using simple physical and mathematical models to derive maintenance status information. In addition, it aggregates sensor information to be analyzed in an off-board system using machine learning techniques with the off-board system providing analysis results as content for Internet services for workshop and customers.

An actual operation of the preventive maintenance is provided by the condition monitoring on-board system continuously aggregating sensor information and processing it to derive maintenance status information. The on-board system sends this maintenance status information to the off-board system and the transmission may be triggered by a timer, the availability of a cost-effective communication, or on the request of the off-board system. The maintenance status information contains vehicle identification timestamp, mileage, aggregated vehicle usage information, and wear information of vehicle components. The off-board system analyzes the provided information and maintains status information to Internet portals to which the consumer subscribes. When an upcoming maintenance service need is detected, suitable workshops are informed with the selection of a suitable workshop being based on distance to the customer's home or work or based on the customer's preference or service history. Information sent to the workshop and to the customer contains customer and vehicle information, urgency, and information concerning the necessary maintenance steps. Subsequently, the workshop may approach the customer by phone, email or otherwise to propose a maintenance activity.

In addition, preventive maintenance based on actual usage involves not only the development of a timetable for when maintenance is to be expected due to usage, but also detects upcoming vehicle problems which are not part of the normal wear due to environmental or usage conditions. The vehicle aggregates processed sensor information necessary to determine status of the vehicle systems and transmits this information to an off-board server. The off-board server uses current and archived data from the one vehicle, data retrieved from many vehicles, and knowledge generated from fleet data to detect abnormal system behavior. Upon detection of such behavior, analysis results are provided as content for Internet service for workshops and customers.

Abnormal system behavior is based on data aggregation stored on the on-board memory, which is subject to simple statistical methods (e.g. generation of histograms). The vehicle then sends this aggregated information to the off-board system with the transmitted information including vehicle identification and time stamp.

The Internet based maintenance and repair services (E-services) are integral components of horizontal and automotive Internet portals, which help to improve customer relations and commitment. Condition monitoring allows enhanced services by providing vehicle related information such as mileage, maintenance status and vehicle usage while also allowing customers to compare vehicle performance with other vehicles of the same brand and model. These condition monitoring data may also be sold to external service providers.

The acquisition of sensor data and vehicle status information from a large number of vehicles enables new areas of product quality for service such as the deployment of selected vehicles as probe vehicles to acquire knowledge about specific vehicle systems or to detect design and quality problems.

Figure 18:
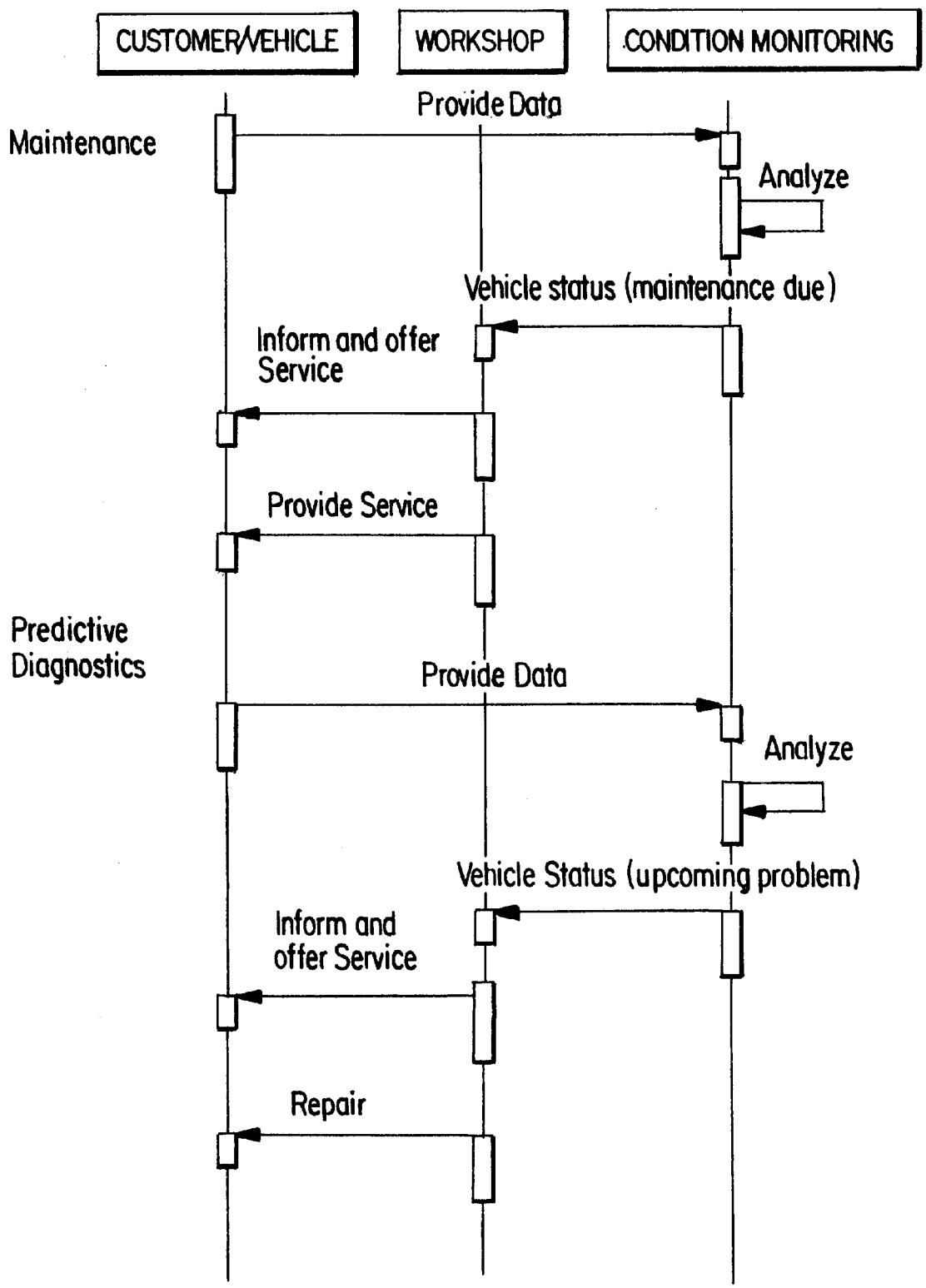
FIG. 18 illustrates the basic processes for a typical maintenance and predictive diagnostics according to the present invention.

FIG. 18 depicts basic processes for the maintenance and predictive diagnostics. Vehicles frequently provide sensor and diagnostic status information to the condition monitoring off-board system, which analyzes the data and generates vehicle status information. In case of required maintenance, the off-board system provides this information to appropriate workshops, which inform the customer that service is due and offers a service package and, upon acceptance of the customer, this maintenance is performed.

With respect to predictive diagnostics, instead of maintenance being due, an indication is given that there is an upcoming problem which is also conveyed to the workshop and then to the customer.

Figure 19:
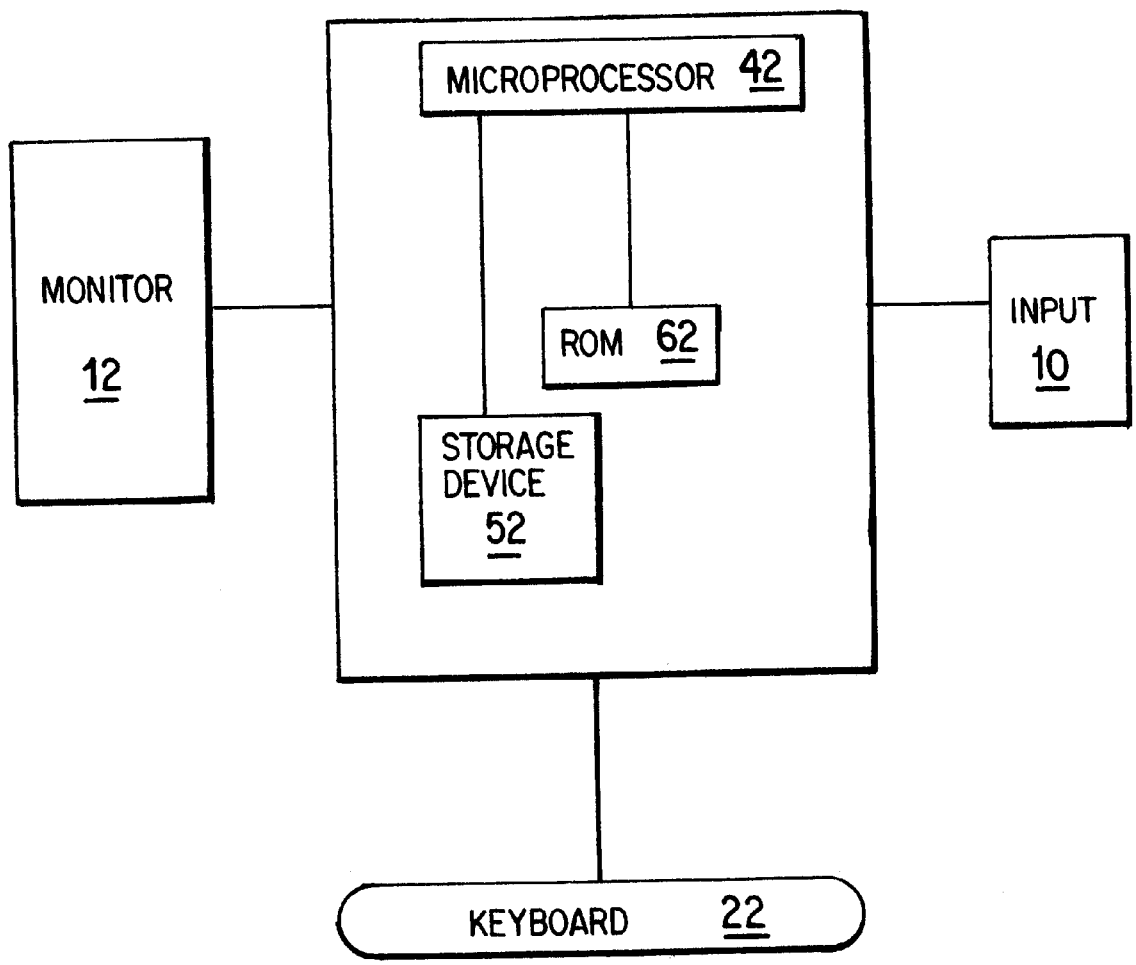
FIG. 19 is a schematic of a computer server system containing software for performing the off-board analysis of the present invention.

FIG. 19 is an illustration of a schematic of a computer server system containing a software for performing the off board analysis. The computer/server 32, which receives the input 10 from the on-board system, has microprocessor 42, ROM 62 and a storage device 52 in a form of a CD, CD-ROM, floppy disk or other media. A keyboard 22 and a monitor 12 complete the system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle component data analysis method, comprising the steps of:
   providing a first version of a behavior model of the component;
   predicting behavior of the component as a function of said first version of the behavior model;
   collecting performance data from the component during usage of the component;
   comparing said predicted behavior with the data collected from the component;
   determining when there is a discrepancy between the predicted component behavior and the collected performance data;
   determining whether said discrepancy results from a failure of said component; and
   if said discrepancy did not result from a failure of said component, modify the first version of the behavior model.

2. The method according to claim 1, further including the step of telematic data transfer between a control center and said vehicle.

3. The method according to claim 1, wherein said modified behavior model provides a prediction of scheduled maintenance time.

4. The method according to claim 1, wherein said behavior model is updated by data of a whole fleet of vehicles of the same type as said vehicle.

5. The method according to claim 1, wherein said behavior model is adapted as a function of environmental and operating conditions of said vehicle.

6. The method according to claim 1 further including the step of minimizing said collected data prior to the step of comparing predicted data with the collected data.

7. A component data analysis method, comprising the steps:
   collecting performance data from a plurality of specific components which were manufactured identical to said component;
   analyzing said collected data and providing a behavior model for said component;
   predicting behavior of said component as a function of said behavior model;

collecting performance data from the component during usage of the component;

comparing said predicted behavior with the performance data collected from said component;

periodically communicating the result of said comparison to a location remote from a vehicle containing said component;

determining whether said communicated results of said comparison indicate a discrepancy between the predicted component behavior and the collected performance data; and modifying said behavior model when said discrepancy does not result from a failure of said component.

8. A program storage device readable by a machine tangibly embodying a program of instruction executable by the machine to perform method steps for performing a component data analysis method, said method comprising the steps of:

storing a behavioral model of a vehicle component;

predicting behavior of the component as a function of said behavior model;

receiving performance data telematically transferred from said vehicle during usage of said component;

comparing said predicted behavior with said transferred data;

determining when there is a discrepancy between the predicted component behavior and the transferred data;

determining whether said discrepancy results from a failure of said component; and if said discrepancy did not result from a failure of said component, modifying the behavior model.

9. A vehicle component data analysis method, comprising the steps of:

testing a plurality of components substantially identical to said vehicle component;

providing a behavior model of said vehicular component as a function of said test data of said plurality of components;

predicting behavior of said component as a function of said behavior model;

collecting performance data from said vehicle component during usage of said component wherein said collection is performed on said vehicle;

comparing said predicted behavior with the data collected from the component;

determining when there is a discrepancy between the predicted vehicle component behavior and the collected performance data;

determining in a location remote from said vehicle whether said discrepancy results from a failure of said vehicle component; and if said discrepancy did not result from a failure of said component, modifying the behavioral model.

10. The vehicle component data analysis according to claim 9 further including the step of communicating from said remote location to said vehicle, the modification of the behavior model.

11. A vehicle component data analysis system, comprising:

means for providing a first version of a behavior model of the component;

means responsive to said first version of said behavior model to provide a behavior prediction of said component;

means for collecting performance data from said component during usage of said component;

means for comparing said predicted behavior with the data collected from the component;

means for determining when there is a discrepancy between the predicted component behavior and the collected performance data;

means for determining whether said discrepancy results from a failure of said component;

means for modifying the first version of the behavior model if said discrepancy did not result from a failure of said component.

12. A system according claim 11, wherein said means for predicting behavior and said means for collecting performance data and said means for comparing said predicted behavior with the data collected from the component are located on a vehicle containing said component.

13. A vehicle component data analysis system, comprising;

a first device for providing a first version of a behavior model of the component and predicting behavior of the component as a function of said first version of the behavior model;

a second device for collecting performance data from the component during usage of the component in a vehicle;

a third device for comparing the predicted behavior with the data collected from the component;

a fourth device for determining a discrepancy between the predicted component behavior and the collected performance data and for determining whether said discrepancy results from a failure of said component;

a fifth device for modifying the first version of the behavior model if said discrepancy did not result from a failure of said component.

14. A system according to claim 13 further including a telematic data transfer device between a control center and said vehicle.

15. A system according to claim 13, wherein said modified behavior model provides a prediction of monitoring time.

16. A system according to claim 13, wherein said behavior model is updated by data of a whole fleet of vehicles of the same type as a vehicle containing said component.

17. A system according to claim 13 further including a means for minimizing said collected data prior to the comparison of predicted data with the collected data.

18. A component data analysis system, comprising:

means for collecting performance data from a plurality of specific components which were manufactured identical to said component;

means for analyzing said collected data and providing a behavior model for said component;

means for predicting behavior of said component as a function of said behavior model;

means for collecting performance data from the component during usage of the component;

means for comparing said predicted behavior with the performance data collected from said component;

means for periodically communicating the result of said comparison to a location remote from a vehicle containing said component;

means for determining whether said communicated results of said comparison indicate a discrepancy between the predicted component behavior and the collected performance data;

means for modifying said behavior model when the said discrepancy does not result from a failure of said component.

19. A vehicle component data analysis method, comprising the steps of:
providing a first version of a behavior model of the component;
predicting behavior of the component as a function of said first version of the behavior model;
collecting performance data from the component during usage of the component;
monitoring wear of said component on the basis of said collected performance data including the step of defining parameters by data compression of operating loads through the use of load aggregates wherein said load aggregates consist of the frequency distribution of monitored input values of said component in order to estimate the service life of said component.

20. The method according to claim 19, wherein said parameterized load aggregates of said component serve as a data set and wherein a plurality of additional components of the same type as said component each provide separate data sets in order that an evaluation can be made from said plurality of data sets to improve an evaluation weighting function or to adapt an evaluation weighting function to changing conditions.

21. The method according to claim 20, wherein a measurement of said input values distributed in said load aggregates is provided by one of a one-dimensional or multi-dimensional instantaneous value count in order to evaluate the state of said component subject to wear.

22. The method according to claim 19, wherein a total wear of a two-dimensional load aggregate is obtained by a summation of individual evaluations of each of the sets of load aggregates and results from the multiplication of a respective frequency input with an evaluation weighting.

23. A program storage device readable by a machine tangibly embodying a program of instructions executable by the machine to perform method steps for performing a component data analysis method, said method comprising the steps of:
storing a behavior model of a vehicle component;
predicting behavior of the component as a function of said behavior model;
receiving performance data from the component telematically transferred from said vehicle during usage of said component;
monitoring the wear of said component on the basis of said received performance data including the step of defining parameters by data compression of operating loads through the use of load aggregates wherein said load aggregates consist of the frequency distribution of monitored input values of said component in order to estimate the service life of said component.

24. The device according to claim 23, wherein said parameterized load aggregate of said component serve as a data set and wherein a plurality of additional components of the same type as said component each provide separate data sets in order that an evaluation can be made from said plurality of data sets to improve an evaluation weighting function or to adapt an evaluation weighting function to changing conditions.

25. The device according to claim 23, wherein a measurement of said input values distributed in said load aggregates is provided by one of a one-dimensional or multi-dimensional instantaneous value count in order to evaluate the state of said component subject to wear.

26. The method according to claim 24, wherein a total wear of a two-dimensional load aggregate is obtained by a summation of individual evaluations of each of the sets of load aggregates and results from the multiplication of a respective frequency input with an evaluation weighting.

* * * * *